United States Patent [19]
Caputo et al.

[11] Patent Number: 5,546,463
[45] Date of Patent: Aug. 13, 1996

US005546463A

[54] POCKET ENCRYPTING AND AUTHENTICATING COMMUNICATIONS DEVICE

[75] Inventors: Anthony A. Caputo, Coatesville, Pa.; Victor P. Amoruso, Cumberland, Md.

[73] Assignee: Information Resource Engineering, Inc., Baltimore, Md.

[21] Appl. No.: 273,764

[22] Filed: Jul. 12, 1994

[51] Int. Cl.$^6$ .................. H04L 9/32; H04L 9/00
[52] U.S. Cl. .................. 380/25; 380/9; 380/23; 380/30; 380/49; 380/52; 375/220; 375/222
[58] Field of Search .................. 380/9, 30, 49, 380/52, 59, 23, 25; 375/220, 222

[56] References Cited

U.S. PATENT DOCUMENTS

| | | | |
|---|---|---|---|
| 4,646,305 | 2/1987 | Tretter et al. | 380/9 X |
| 4,924,516 | 5/1990 | Bremer et al. | 380/9 X |
| 5,131,025 | 7/1992 | Hamasaki | 380/25 X |
| 5,224,166 | 6/1993 | Hartman, Jr. | 380/25 X |

*Primary Examiner*—Bernarr E. Gregory
*Attorney, Agent, or Firm*—Hoffmann & Baron

[57] ABSTRACT

A portable security device is disclosed which can be carried by an individual and connected directly to telephone circuits to both authenticate that individual and encrypt data communications. The invention can operate as an electronic "token" to uniquely identify the user to a network, to a computer system or to an application program. The "token" contains the complete network interface, such as a modem, which modulates the data and provides the circuitry required for direct connection to the network. Furthermore, this "token" will not permit communications to proceed until the device, and optionally the user, have been identified by the proper authentication. The token also contains all of the cryptographic processing required to protect the data using data encryption or message authentication or digital signatures or any combination thereof. Thus, the present invention provides the user with all of the communications and security equipment needed for use with personal computers and electronic notebooks and eliminates the need for any other security measures and/or devices.

3 Claims, 12 Drawing Sheets

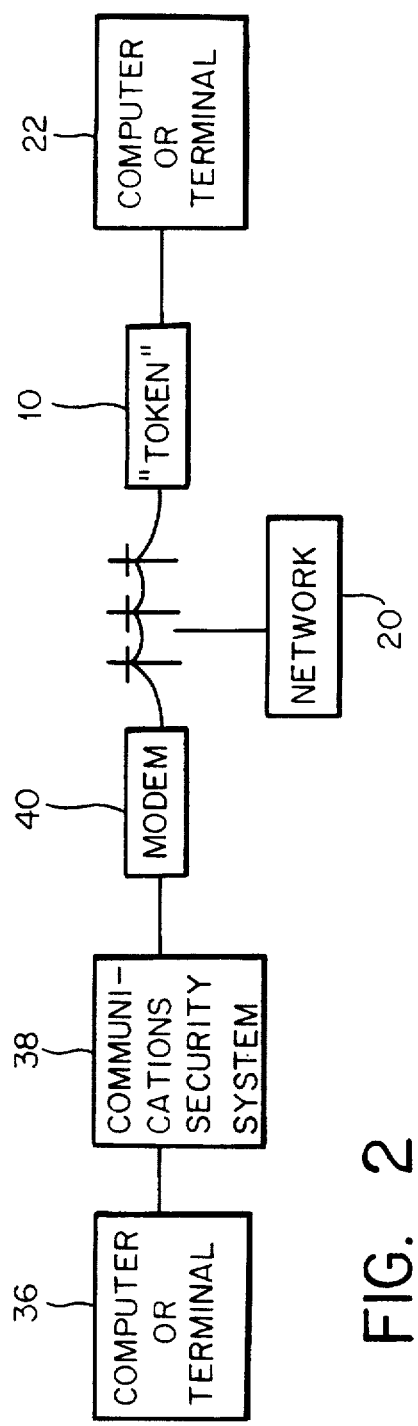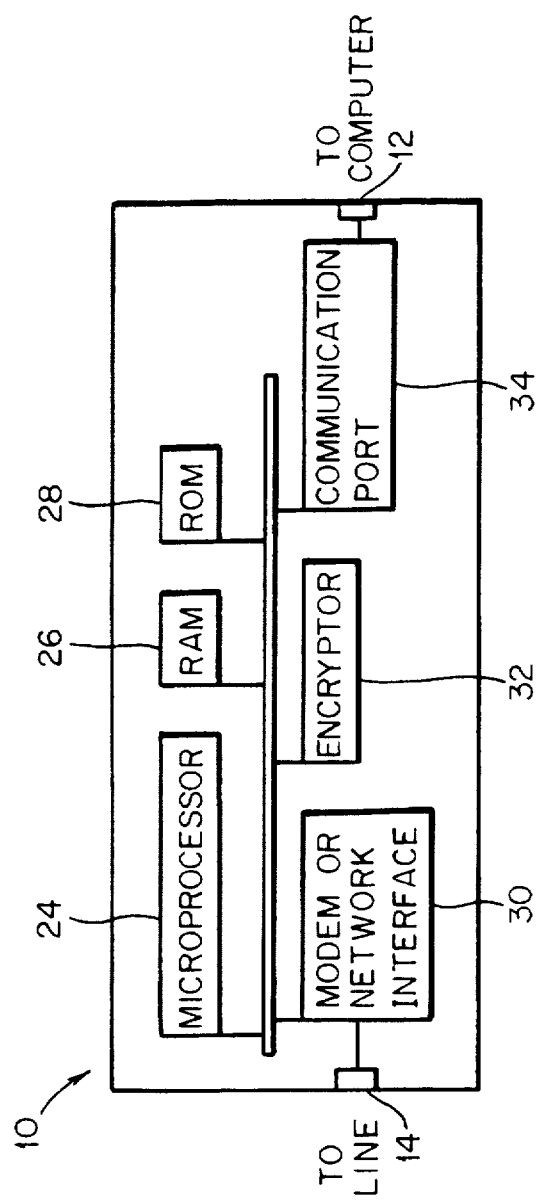
FIG. 3
FIG. 2

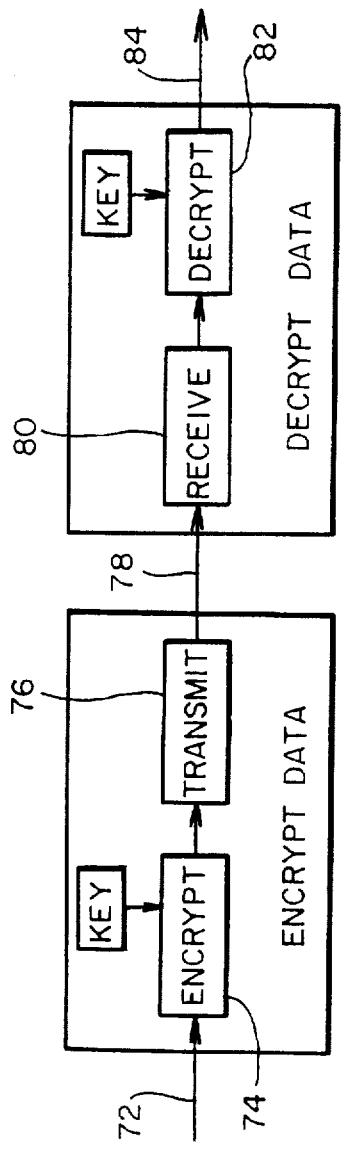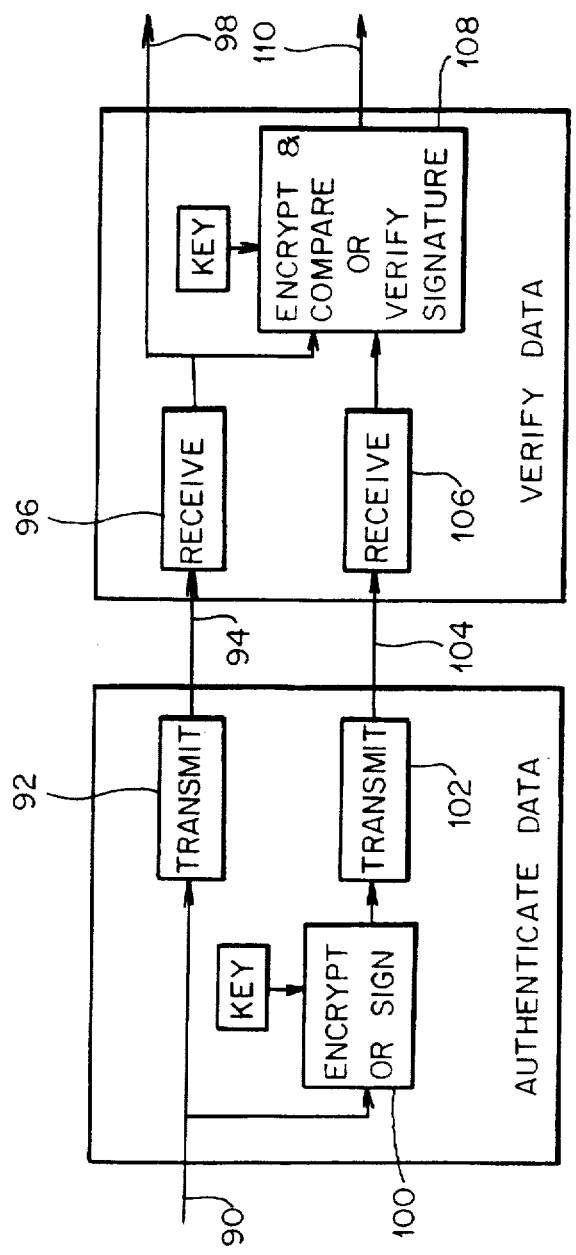

POCKET ENCRYPTING AND AUTHENTICATING COMMUNICATIONS DEVICE

BACKGROUND OF THE INVENTION

This invention relates to a complete and transportable security device having a network communications interface which provides encryption and authentication capabilities to protect data and restrict access to authorized users. The device can be carried by the user in a pocket or a purse.

The rapid growth in the use of distributed computing has caused a vast increase in the transmission of sensitive and vulnerable data on computer networks. This increase in private data on communications lines has opened network computing to substantial risk. These risks include the ability for unauthorized persons to gain access to networks or computers and for eavesdroppers to read proprietary data on the communications line. At the same time, there is an increased need for communications equipment to be compact and convenient so that it can be used with laptop computers and other personal computing equipment.

Data encryption is herein defined as a technique to protect the confidentiality of data to ensure that it is not disclosed or revealed to unauthorized persons. Device authentication is herein defined as a technique to identify and control access to a network or system by a specific device or "token." User authentication is herein defined as being similar to device authentication except that the user is identified instead of a device. Message authentication is herein defined as a technique which safeguards against the undetected modification of data in transit or the counterfeiting of data. Each of the aforementioned techniques can be based on either secret key or public key cryptography. The capability to perform this cryptography is herein referred simply to as encryption.

Data encryption has been used in the past as described in Ehrsam U.S. Pat. No. 3,962,539. Data authentication, which has been used in the past by banking and other financial industries, is a technique to detect any modification of communicated data.

The idea of authentication of the user by something the user possesses, such as a smartcard, or something the user knows such as a Personal Identification Number (PIN) or a biological attribute of the user such as a fingerprint, is known in the art. These methods have not, however, provided a complete communications security system to be carried by the user.

U.S. Pat. No. 4,546,213 describes a modem security device, but the device does not provide efficient encryption and authentication capabilities nor can it be carried as a "token" to control access to a computer network. Several methods of "authenticating" the user using "biological" attributes, such as fingerprint readers, retina (eye) scanners are known. For example, U.S. Pat. No. 5,153,918 describes a security system for data communications for securing access to a computer system using voice recognition as the access control medium. Similarly, Young and Hammon in U.S. Pat. No. 4,805,222 describe the use of operator keystroke dynamics to identify the user. Unfortunately, these methods have proven to be expensive for ordinary commercial use and have been considered to be inconvenient or intrusive by potential users.

Lessin, U.S. Pat. No. 4,868,376, incorporates a means of authenticating a user with a personal identification number (PIN). The Lessin security device is contained in a portable housing, such as a smartcard, but requires connection to a non-portable reader and does not include means for direct connection with a telephone network. U.S. Pat. No. 5,301,234 describes a radiotelephone installation for prepayment operation with security protection using encryption to authenticate the device, but the '234 reference discloses use of the device in conjunction with payment of services for radiotelephone sets—not digital communications security with data encryption. U.S. Pat. No. 5,239,294 describes a means of authenticating a subscriber's device to control access to cellular telecommunications networks, but is specifically directed to use with radio telecommunication systems.

It is, therefore, an object of the present invention to overcome shortcomings associated with prior art systems and devices. These objects will be made known to those skilled in the art from the following description.

SUMMARY OF THE INVENTION

The present invention is a transportable authenticating and encrypting device which includes an encryptor for encrypting data received by the device, an authenticator for authenticating use of the device by a user, and a modem for transmitting the data and for receiving the data over a data transfer path, such as a telephone line. The encryptor, authenticator, and modem can be co-located in a compact housing whereby the device can be conveniently transported on the person of the user in a discrete manner, such as in the pocket or purse of the user.

Furthermore, the device includes at least one port for connection to a data transfer path and at least one port for connection to a computer communications port.

The authenticator is preferably a cryptographic means which identifies the authorized user by an authorized user identification such as a message authentication code or digital signature.

The encryptor is preferably a means for encrypting data transmitted or received by the user.

The portable encryption and authentication device preferably employs the use of a keypad mounted on the housing to enter a personal identification number (PIN). The authenticator can also be operated by the insertion of a smartcard which contains a pin or code which uniquely identifies the user.

Preferably, the compact authenticating and encryption device includes a means of detecting the modification of messages sent or received by message authentication codes or digital signatures.

Also, preferably, the keys used for encryption and the keys used for authentication may be changed from a remotely located key management center or by another authorized encryption device.

As a result of the present invention, an entire security communications device is provided which operates as a token to electronically identify a user, especially in conjunction with the use of a personal identification number (PIN) to prevent use by others.

The present invention is a device which incorporates the use of encryption and authentication techniques uniquely with a communications interface device, such as a modem. The device is portable and can replace an entry means (such as a token) to identify the user and protect communication from unwanted eavesdropping.

As a result of the present invention, architecture has been provided to advance the art significantly by the integration of security and interface functions in a single portable device which can be used as an access control means to another computer or network.

These advantages have been met by incorporating into a portable-sized housing the combination of a highly secure message encryptor and user authenticator. This device serves as an entry token which can be assigned to an individual and easily transported by that person in a pocket or purse and uniquely identifies that person to another such cryptographic device.

As a result of the present invention, separate physical components have been eliminated as well as cabling, and other hardware associated with cryptographic communications equipment. Consequently, the complete communications security protection can be provided for portable computers such as laptops and notebook computers.

Furthermore, as a result of the present invention, the operation and setup of otherwise complex and sophisticated equipment is simplified significantly. This has been done by eliminating configuration and cabling requirements and adjustments usually associated with discrete modem, encryptor, and authenticator components.

Moreover, as a result of the architecture provided herein, communications must be passed through the proper cryptographic protection in order to order to provide access to the user. Moreover, protection cannot be defeated either through accidently bypassing connections to the encryptor or by mere neglect. Furthermore, encryption and authentication services can be provided for software application.

Other and further objects and advantages of the present invention will be realized by those skilled in the art upon consideration of the following description taken together with the drawings, and the scope of the invention will be set forth in the appended claims.

BRIEF DESCRIPTION OF THE DRAWINGS

Preferred embodiments of the invention have been chosen for purposes of illustration and description, but are not intended in any way to restrict the scope of the present invention. The preferred embodiments of certain aspects of the invention are shown in the accompanying drawings, wherein:

FIG. 2 is a block diagram of one embodiment of the present invention depicting a microprocessor bus and communication connections;

FIG. 3 is a block diagram showing the connection and use of the present invention in a computer network;

FIG. 6 is a block diagram which depicts data encryption and decryption;

FIG. 7 is yet another block diagram which depicts authentication and verification;

DETAILED DESCRIPTION OF THE INVENTION

The present invention is a portable device which can be used as an identifying token, a communications network interface, a data encryptor, and a user authenticator. It provides an electronic token which can be carried by the user to uniquely identify him or her to a network, to a computer system or to an application program. The device contains the modem which modulates the data in such a way that it can be directly connected to a data transfer path, such as telephone network. The device will not permit communications to proceed until such device and, optionally, the user, have been identified by the authenticator. The device also contains all of the cryptography required to protect the data using data encryption or message authentication or digital signatures or any combination thereof. Thus, the present invention provides the user with all of the communications and security equipment needed for use with personal computers and electronic notebooks and eliminates the need for any other security apparatus. The device is a complete service interface/security device which makes complete communications security practical when used with portable computing equipment.

Although the description which follows contains many specifics, these should not be construed as limiting the scope of the invention but merely illustrate some of the many possible variations and/or embodiments. For example, the modem could be connected to a Local Area Network (LAN) in place of a telephone system. Furthermore, the data transferred therethrough could include video images as well as messages.

Figure 1A:
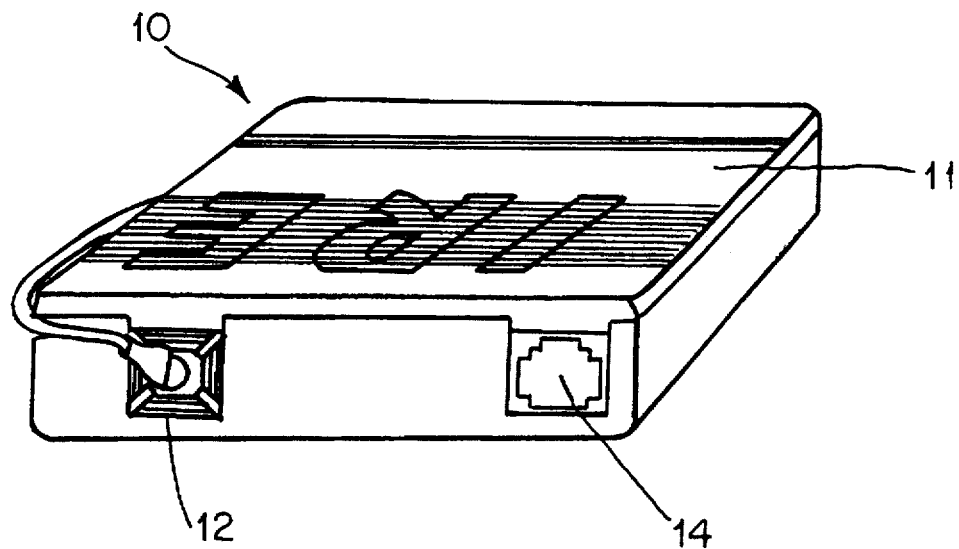
FIG. 1A is a perspective view of a compact authenticating/encrypting device in accordance with the present invention.

Referring to FIG. 1A, the encrypting/authenticating device 10 is depicted in a single housing 11 of convenient size which may be physically protected from unauthorized tampering. It is possible to use a potting compound having solvents which cause damage to electronic components, making the device inoperable.

The device 10 includes communications port 12 having a cable for direct connection to a computer port of a personal computer or terminal. Device 10 further includes a port 14 having a modular receptacle or cable which can be directly connected to a data transfer path, such as a telephone system.

The selection of power source will depend upon the nature of the user's environment. Power to operate the device can be supplied by any of several sources: a battery, an external power supply module, a connector to the keyboard, a connector to other ports of the user's computer, or else power drawn from the communications circuits.

Figure 1B:
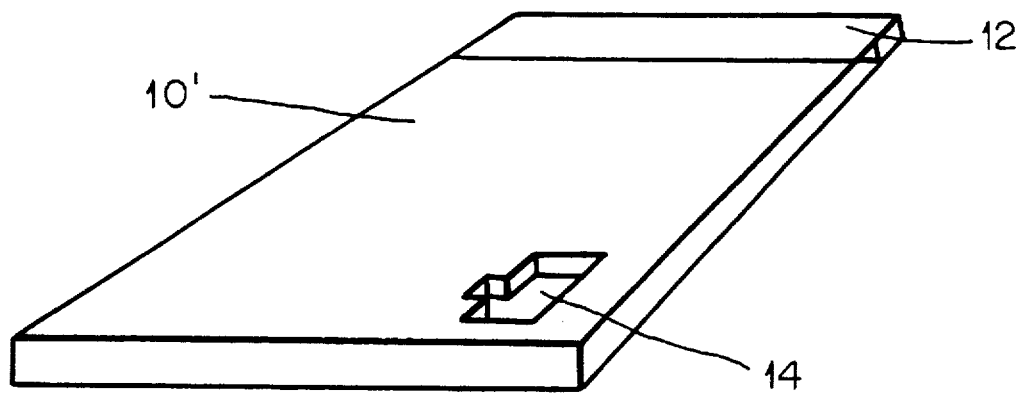
FIG. 1B is a perspective view of a card-size embodiment of an encrypting/authenticating device according to the invention.

FIG. 1B illustrates another embodiment of the encrypting/authenticating device 10', except that the physical manifestation is a card, similar in length and width to a credit card. One connector 12 is a standard female receptacle known to the art as a PCMICA connector which can be directly connected to any personal computer with a corresponding connector. Another connector 14 is a modular receptacle for direct cable connection to a telephone system.

Figure 1C:
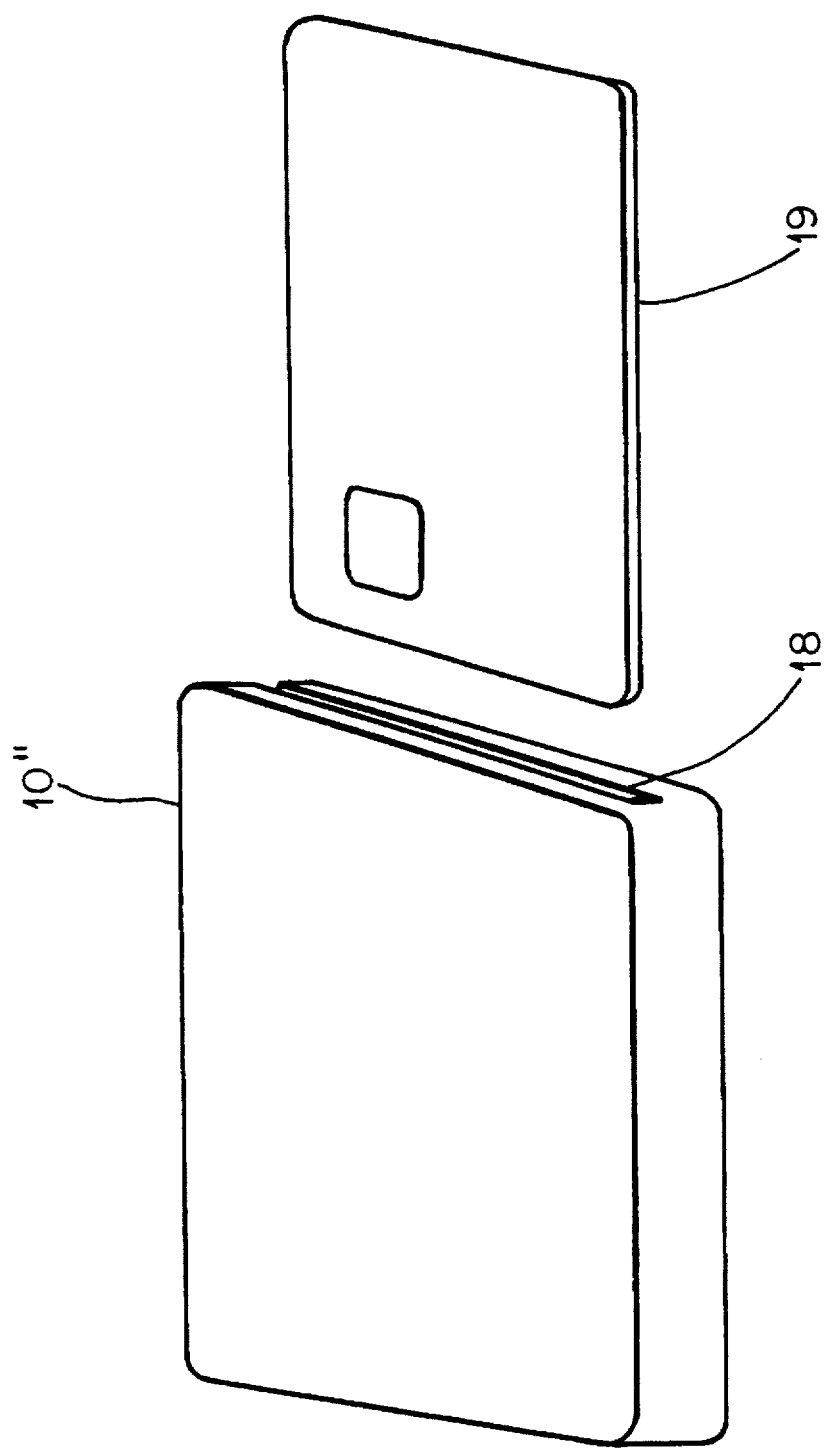
FIG. 1C is top perspective view of a device in accordance with the present invention which is prepared for receipt of a smart card.

FIG. 1C depicts a device 10" in accordance with the invention which is designed to receive a smartcard 19 in receptacle 18. The smartcard 19 and device 10" operate cooperatively as an encrypting/authenticating device.

FIG. 2 is a block diagram of the major components of the encrypting/authenticating device 10, showing connectors 12 and 14, and use of a microprocessor bus to control internal functions. Referring to FIG. 2, a microprocessor 24, RAM 26 and ROM 28 execute a program to control the encryption, authentication and modem functions. The modem 30, encryptor 32 and communications port 34 respond to control signals to provide the cryptographic functions. The encryptor 32 provides a cryptographic function, such as by signal, punch-board, algorithms, etc., and procedures which can be executed in a microprocessor. These functions can also be accomplished by use of a set of available commercial encryption chips which are designed to interface with a microprocessor. The encryption function is used to perform data encryption as well as all of the forms of authentication described herein. The embodiment illustrated in FIG. 2 is not necessarily descriptive of the physical circuit components because many of the functions can be integrated into common physical packages. For example, the communications port 34 may be an integral part of the microprocessor chip 24. Similarly, the encryptor 32 may be performed by the firmware of the microprocessor 24 and its memory and, therefore, not actually implemented as a separate integrated circuit chip.

The operation of the device with respect to data encryption, device authentication, user authentication and message authentication will now be described. Specifically, FIG. 6 shows the encryption and decryption of communications data. Both the encrypt and decrypt functions are employed so that messages can be both sent and received. Plaintext data 72 is encrypted (Block 74) using a plurality of encryption algorithms well known to practitioners such as Feistel, U.S. Pat. No. 3,798,359 or Rivist, U.S. Pat. No. 4,405,829. The cryptographic algorithms used to perform these functions may be chosen from a variety of standard algorithms, usually in conformance with federal or national standards, and do not need to be described here in further detail. The choice of algorithm is unimportant to this invention. For example, encryption and decryption could be performed in accordance with American National Standard (ANS) X3.92, Data Encryption Standard, or by the Federal Information Processing Standard 185, Escrow Encryption Standard. The encrypted data is rendered unintelligible and therefore is kept confidential when it appears on the communications line 78. The data is received (Block 80) and sent to a decryption function using a decryption algorithm which corresponds to the encryption algorithm described above and which recovers at output 84 the original plaintext 72. The only requirement is that they keys used by these standards for encryption and decryption must correspond and the modes of operation specified in these standards must be that same for encryption (Block 74) and decryption (Block 82).

In addition to encrypting the communicated data as described, above, the communicated data can be authenticated by the sender and verified by the recipient. Data (or message) authentication verifies that data has been received without modification and also verifies the identity of the sender. In FIG. 7, data 90 is transmitted (Block 92) by means of a communications system 94 to a recipient 98. The data is authenticated by a plurality of authentication algorithms well known to the art, all of which process messages and produce an authenticator number or digital signature which is transmitted with the data for use in verifying its source and accuracy. Examples of this process are described in detail in American National Standard X9.9, Message Authentication Standard, or American National Standard X9.30, Digital Signature Standard, or in numerous patents such as U.S. Pat. No. 4,995,082. The result of this authentication process is transmitted (Block 102) to a recipient 104 who performs the verification process (Block 106) to determine if the data 90 has been modified before reception (Block 96). The verification process depends upon the algorithm chosen to implement the present invention. If the authentication was performed in accordance with American National Standard X9.9, for example, then the validation process consists of encrypting the data in block 106 in accordance with the standard and in the same way as was done in block 100 and then comparing the resulting authentication codes with the authentication code which was received 104. If the message was modified in transit or if the keys used to authenticate and validate differ, then with a high degree of probability, the authentication codes will also differ. If digital signatures are used for authentication, then the signing process (Block 100) and the verification process (Block 106) will use different algorithms which are specified in detail in the appropriate National or Federal standard. In this case, the private key used to sign the data and the public key used to validate it form a set which will correctly validate the data. If a different private key is used to validate the data than the one in the set, then validation with the public key of the set will fail. In this case there is an unambiguous indication that the sender possesses the unique private key and is presumed to be the authorized sender. In any case, the result of the verification decision (Block 108) is provided to the recipient to indicate whether or not the data is valid. This can simply be in the form of a message which describes the accompanying data as being valid or invalid.

Device authentication is performed in order to ensure that a user who wishes to obtain access to communications equipment possesses an authorized device. The authenticity of the device will be determined by the presence of a secret or private key either contained within the device itself or within a smartcard inserted into the device. The device, therefore, serves as a "token" which must be employed to gain access to a network, computer or other protected communications facility. If the "token" is invalid, then access will be denied.

User authentication is performed to indicate to the challenger that the user of the device knows a Personal Identification Number (PIN) or password which uniquely identifies the individual in possession of the device. This adds to the security of the system by ensuring that a stolen device, for example, cannot be used. In the present invention, the user authentication procedure is optional, and when this option is employed, it is combined with the device authentication process.

Figure 5A:
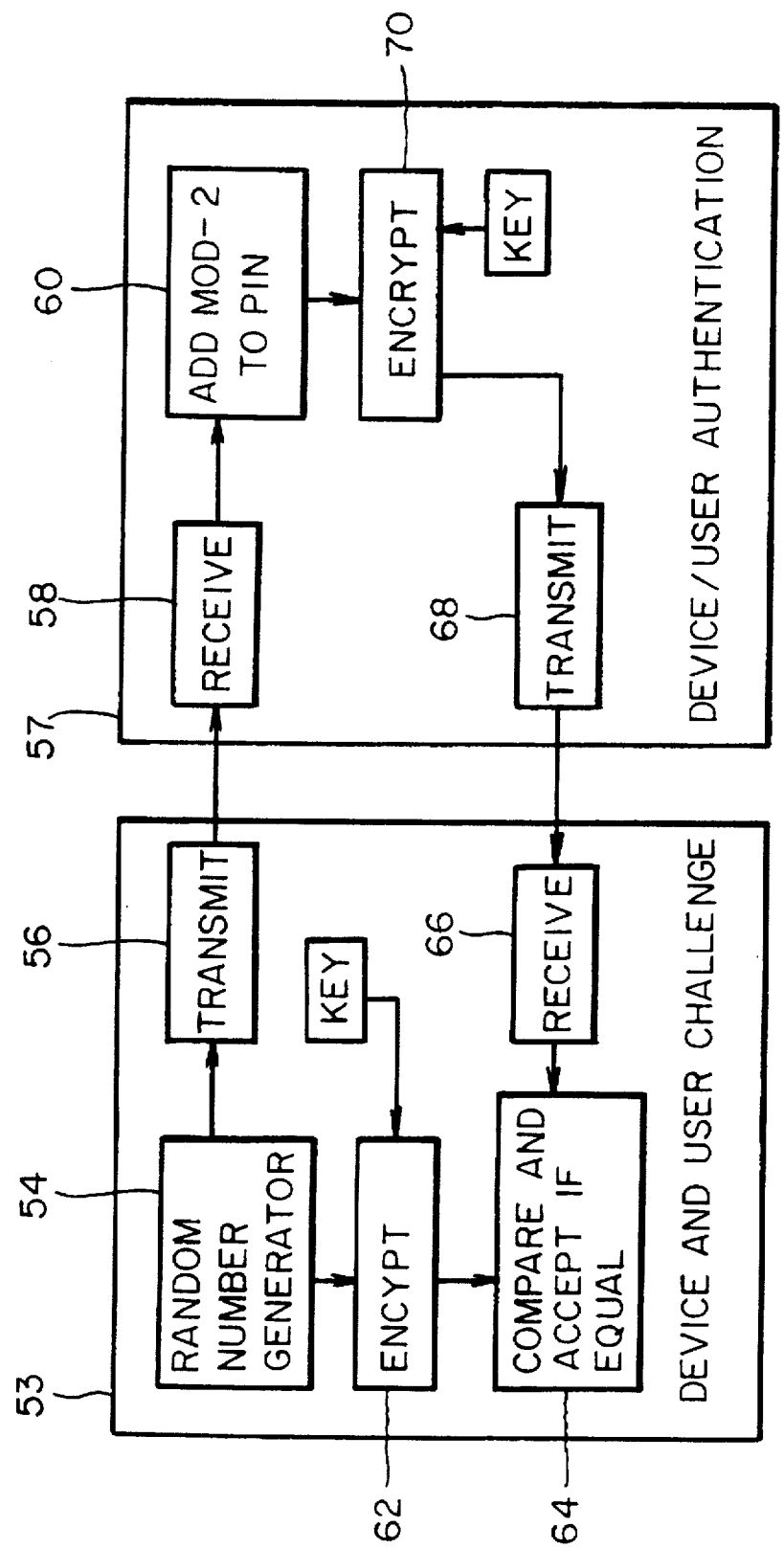
FIG. 5A is a block diagram which depicts both the device and user authentication in accordance with standard message authentication.

The challenger's portion of the system described in block 53 of FIG. 5A is known in the art and can be purchased from several vendors to meet a number of National and Federal Standards as described above. When used with the user's portion, i.e. block 57, these components form a portion of the described embodiment of the present invention. The device authentication process is similar to that of message authentication described above, except that a time-varying number 54, such as a random number (or a time and date), is authenticated instead of communications data. This number is sent (Block 56) to the recipient (Block 58) whose operator is optionally asked to enter a Personal Identification Number (PIN) to uniquely identify the user. The PIN, when used, is added to the time-varying number modulo 2. The result is encrypted 70 under a unique key assigned to the device. In another embodiment, the user inserts a smartcard which contains the unique key and the processor used to accomplish the encryption of block 70. The encrypted result is sent (Block 68) to the challenger and received at block 66. The time varying number 54 is encrypted (Block 62) by the challenger under the same key and is compared with the encrypted item received (Block 66). If they match, then the user is considered to be properly authenticated. If the user does not possess a device containing the correct key, if the PIN entered by the user is incorrect, or if a previously recorded version of the time varying number sent by 56 or the encrypted response sent by 70 is used in this transaction, then the comparison will, with virtual certainty, fail. The result of this comparison may be used by the challenger to terminate the communications session and alert a security officer that an unauthorized device or person is attempting to access the challenger's equipment.

Digital signatures are a form of authentication which differs from the symmetrical key technology described above in that the signer has a unique private key and the verification process uses a companion public key which can be used to verify the signature as valid. This provides an additional property that the signer is the only holder of the private key and can, therefore, not repudiate having performed a verified signature. In this preferred embodiment, this device and user authentication procedure can also be accomplished using one of a plurality of digital signature algorithms well known to the art, such as American National Standard X9.30, Digital Signature Standard and Secure Hash Algorithm.

Figure 5B:
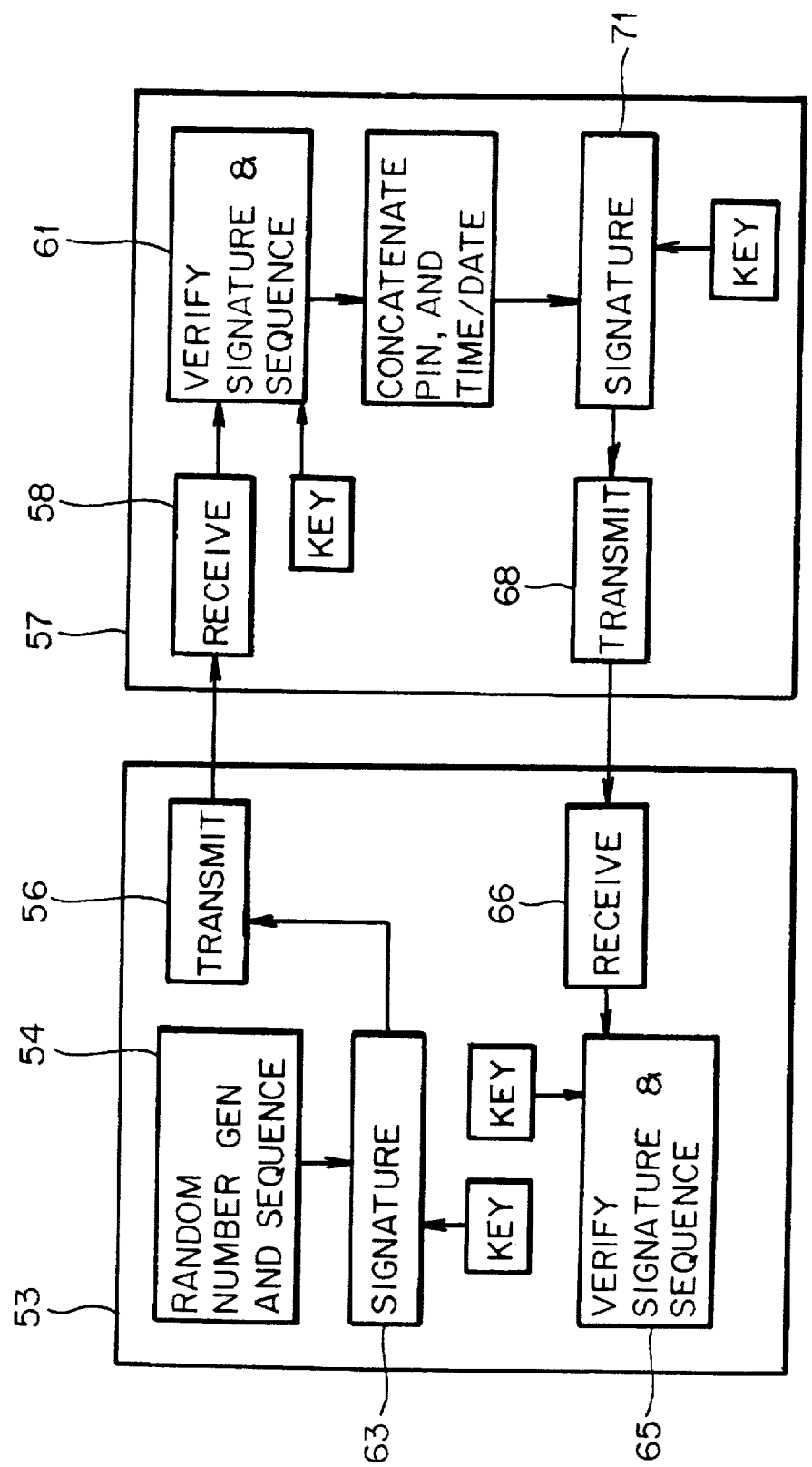
FIG. 5B is a block diagram which depicts device and user authentication in conjunction with digital signatures.

FIG. 5B describes a device and user authentication. In this case, the user's name and, optionally, PIN is signed (Block 71), along with a counter (or time and date) which indicates that the data sent can be identified as not having been sent previously. The signature is performed using the user's unique private key. The user's name and the signature produced by the X9.30 algorithm are sent (Block 68) to the recipient (Block 66) and verified (Block 65) using the corresponding digital signature verification procedure specified by the standard and a copy of the user's public key. The result of the verification process (Block 65), like the comparison test (Block 64), is a simple pass or fail.

The national standards described in this embodiment are examples of common algorithms known to the art and are not the only means of performing the encryption or authentication functions of the present invention. Moreover, analogue and/or digital circuitry can be used to implement the various elements of the present invention.

The two ports of the encrypting/authenticating device 10 described in FIG. 1 are connected in FIG. 3 to a network 20 and a computer or terminal 22. This permits two basic modes of operation:

a) in-line communications in which data transmitted from authenticated user is passed through the device in a single pass and sent in encrypted form to the network through the modem;

b) off-line communications in which data to be transmitted is sent to the device and, after authentication and encryption has been performed, is returned to the user's computer application or terminal for subsequent transmission to the network, possibly as part of another message.

Data received by the network is processed in the reverse order as the transmitted data described, above.

In FIG. 3, the device 10 of the present invention is connected to a network 20 which contains other equipment which provides data encryption, device authentication, user authentication and message authentication services as defined herein. The encryption and authentication component 38 and the modem 40 can be another encrypting and authenticating modem similar to device 10, or can be a collection of commercially available communications security components which are built to compatible standards, as shown in FIG. 3.

In the following discussion, two modes of operation have been addressed, the in-line mode and the off-line mode (sometimes referred to as the attached mode). A set of codes or signals are issued by the user or user's computer to cause the encrypting/authenticating device to switch between these operating modes.

Figure 4A:
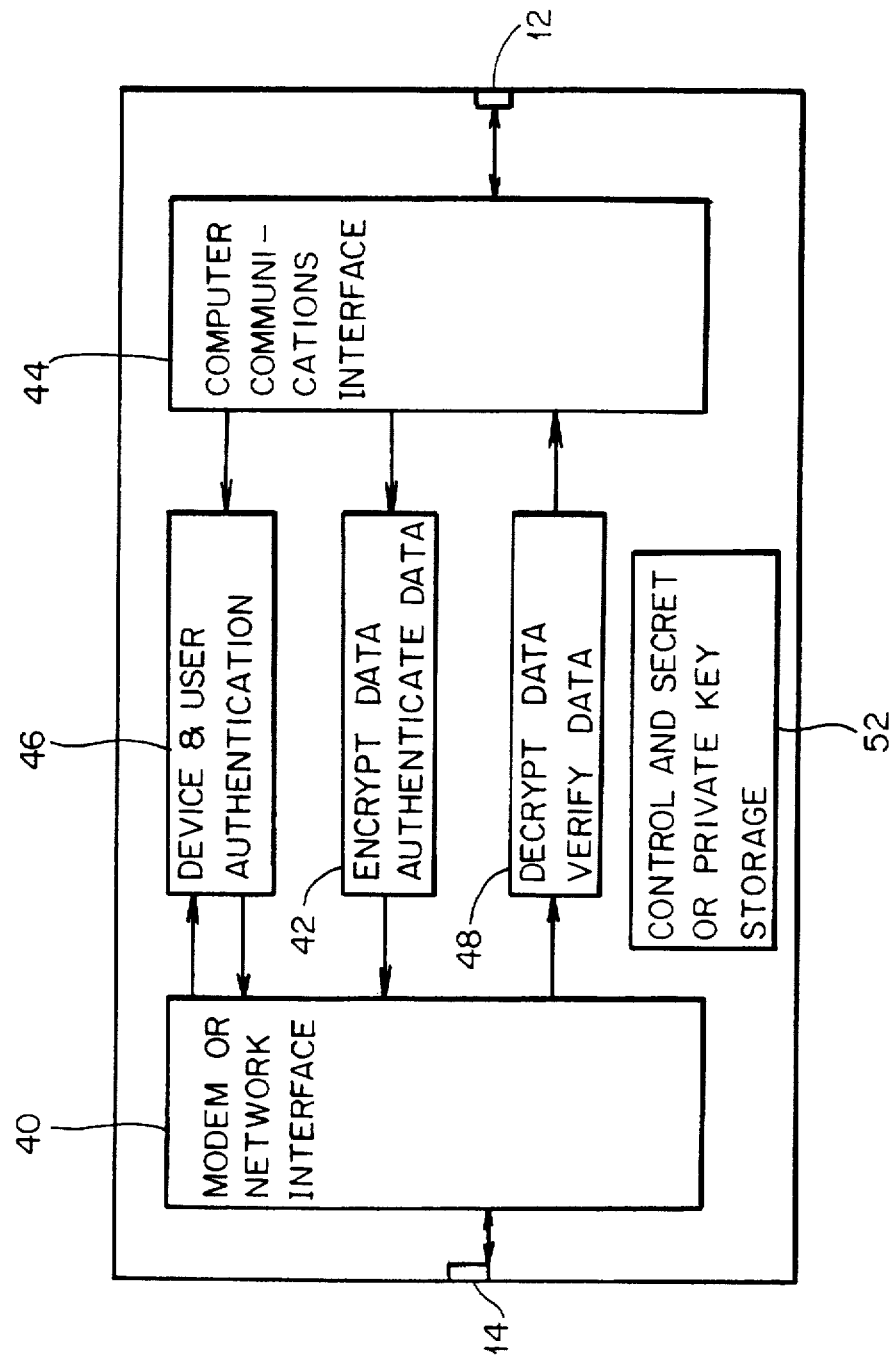
FIG. 4A is a diagram of the flow of data within the encrypting and authenticating device of the present invention, which shows the processing sequence for in-line mode of encryption and authentication.

Referring to FIG. 4A, the flow of data through the encrypting/authenticating device in the in-line mode of operation is as follows:

At the beginning of a session, initiated either by the user or detected by the presence of carrier at the modem 40, a device authentication procedure is performed and, optionally, a user authentication procedure is performed. If the authentication procedure fails, then the program will not enable the call and the modem will disconnect (hang up the call). If all authentication procedures succeed, then the carrier detect line be raised at the interface 12 to the user's computer or terminal, enabling the call. No data will be transmitted until the call is enabled in this way.

Device authentication, as shown in FIGS. 5A and 5B, is performed by applying an authentication algorithm to a known code, the serial number of the device 56 and a sequence number 58 which increases for each session. The authentication algorithm can be any known to the art, such as ANS X9.9 message authentication code, ANS X9.30 digital signature algorithm (DSA) or ANS X9.31 digital signature algorithm (RSA). Each of these algorithms employ a secret or private key to perform a cryptographic process upon the items listed above and produce an authenticator code or digital signature. The key 54 used to perform this authentication is held secret so as to prevent others from counterfeiting this code or signature. The result is returned by means of the modem 40 to the sender 38 where it is verified by a procedure described in the authentication standard.

User authentication is an optional procedure which can be invoked at the beginning of the session to ensure that an authorized user or users are in possession of the device. It is performed by sending a time-varying parameter from the remote device 38 to challenge the user. This parameter could take the form of a random number or the time and date, for example, and should not repeat for a long period of time. The encrypting/ authenticating device 10 then may prompt the user for the entry of a password (or PIN) or the insertion of a smartcard containing a unique code to establish his or her identity. The entry is encrypted or used to authenticate a digital signature in accordance with the algorithm selected.

The result is returned by means of the modem 40 to the sender of the time-varying parameter 38, for verification.

Both device authentication and user verification can be performed by the same or different algorithms. If the same algorithm is used, then the procedures can be combined.

Once authentication has been successfully completed so that the identities of the device and, optionally, the user have been established, then data encryption (Block 42) and decryption (Block 48) will be allowed to begin. See FIG. 4A. This invention does not permit any of the user's data to pass before authentication is successfully consummated and only passes items such as authentication codes and automatic key management messages requires to securely establish the call. Data may be transmitted by the user's computer or terminal and received at the communications interface 44 of the encrypting/ authenticating device 10 where it is encrypted (Block 42) and passed to a modem function 40 for transmission on a telephone line at connector 14. Data received from the line at the modem 40 will be decrypted (Block 48) and sent by the communications interface 44 to the communications port of the user's computer or modem.

Figure 4B:
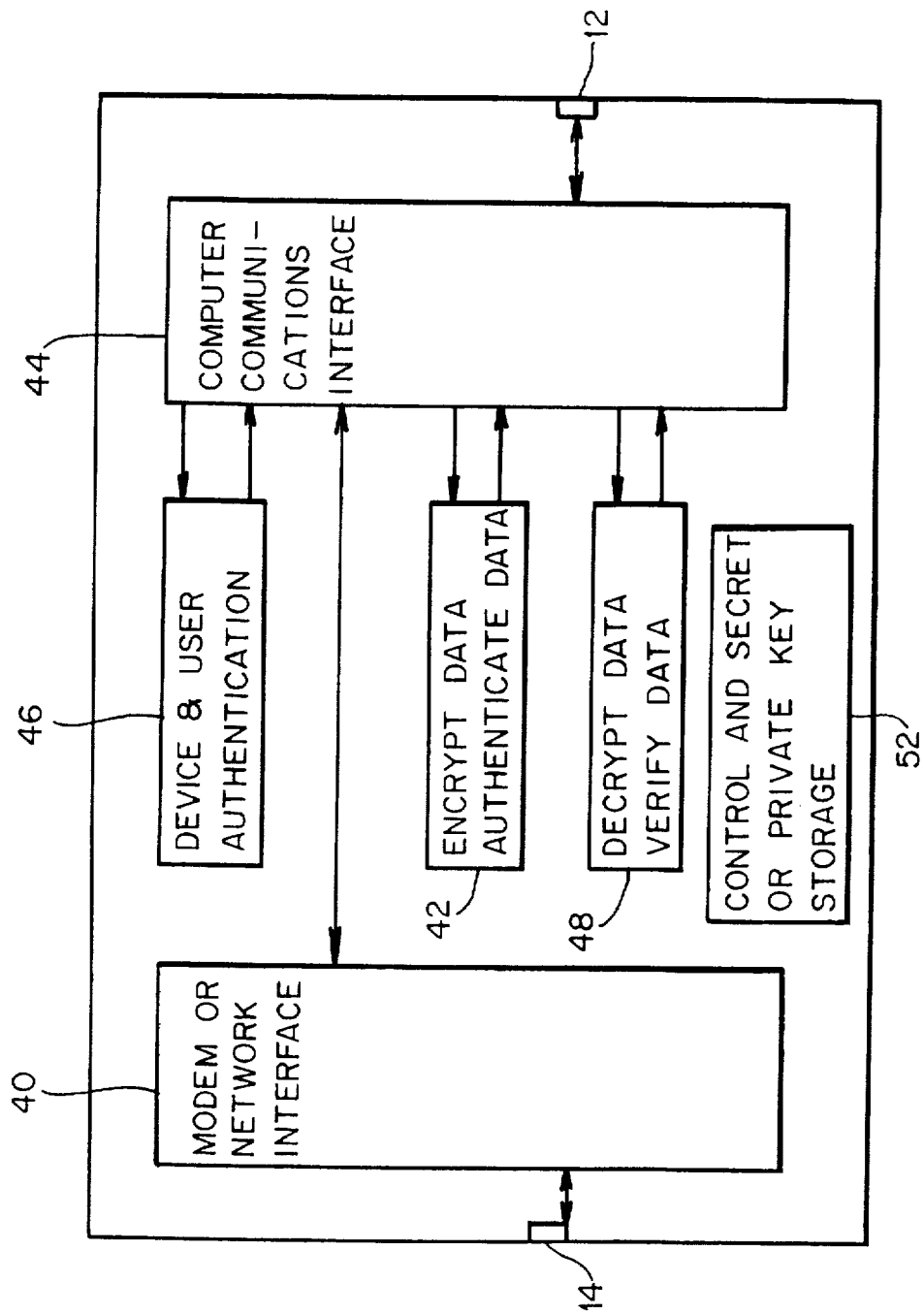
FIG. 4B is a diagram of the flow of data within the encrypting and authenticating device of the present invention which shows the processing sequence for off-line mode of encryption and authentication.

Referring to FIG. 4B, the flow of data through the encrypting/authenticating device 10 in the off-line mode of operation is the same as that described, above, for the in-line mode except that the encrypted data of block 42 is returned to the user's computer or terminal by means of the interface 44 for storage or subsequent transmission by the user. If subsequently transmitted, the data from connector 12 to interface 44 is sent directly to the modem 40 for transmission on the telephone line, bypassing encryption.

In the off-line mode, data received at the modem 40 bypasses decryption and is sent by the interface 44 directly to the user's computer. The user can subsequently decrypt the data by passing the data through the interface 44 to the decryption block 48 for return to the user by means of the interface 44 and connector 12.

Referring to FIG. 7, the internal modem or other communications interface initiates calls when the user issues an industry-compatible modem command to begin dialing. This command is passed directly to the modem as long as no carrier is present on the line. Incoming calls begin with the appearance of carrier on the communications media which causes the modem to raise carrier detect to the microprocessor. In either event, the modem acquires carrier 120 (see FIG. 8) and performs any key establishment which must be performed to initiate a call. This process can simply be the manual loading of a key into the memory of the Pocket Encrypting and Authenticating Device or it could provide for automatic key changes. The selection of method of key entry and management is not important to the description of the present invention as several national standards exist for the management of cryptographic keys, such as American National Standards Institute X9.17. The device then waits for a challenge from the network or other security device. Any security device which meets American National Standard X9.26, for example, will function like FIG. 5A, block 53 and supply this random or time-varying challenge.

Figure 8:
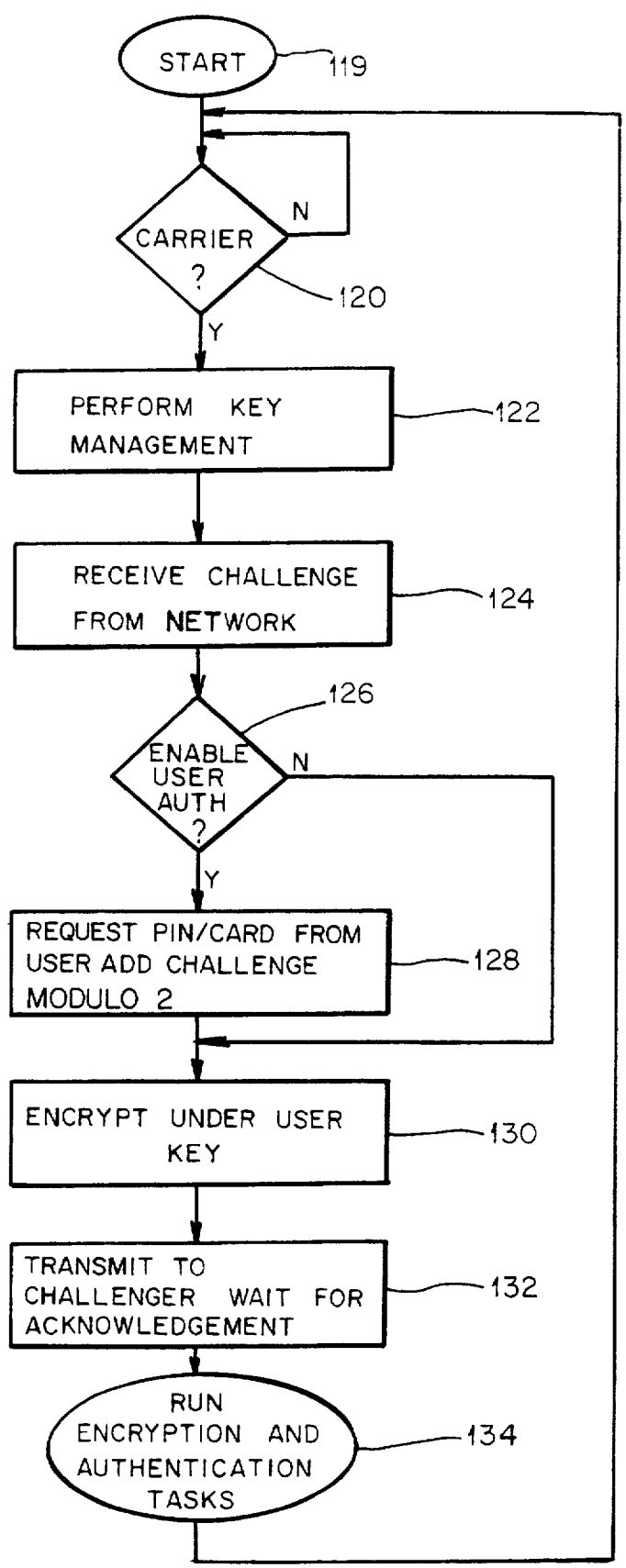
FIG. 8 is a flow diagram which describes the process for call establishment.

Referring to FIG. 8, when the challenge is received and the device is configured to require user authentication, then the user is prompted for a PIN or smartcard insertion. The PIN, or other identifying number is added to the challenge modulo two, an arithmetic operation which is also known as the logical exclusive-or. This ensures that the result will not match if the PIN is incorrect. The challenge is then encrypted in order to both hide the PIN and provide proof to the challenger that the device possesses the correct encryption key. The encrypted result is returned to the challenger to be checked as described previously. If the verification process is not successful, then the challenger hangs up the call or otherwise ends the communication session. If it is successful, then an acknowledgment, defined in the user authentication standards, is returned to the device and communications is also enabled by the challenger so the network or computer is accessible.

Figure 9:
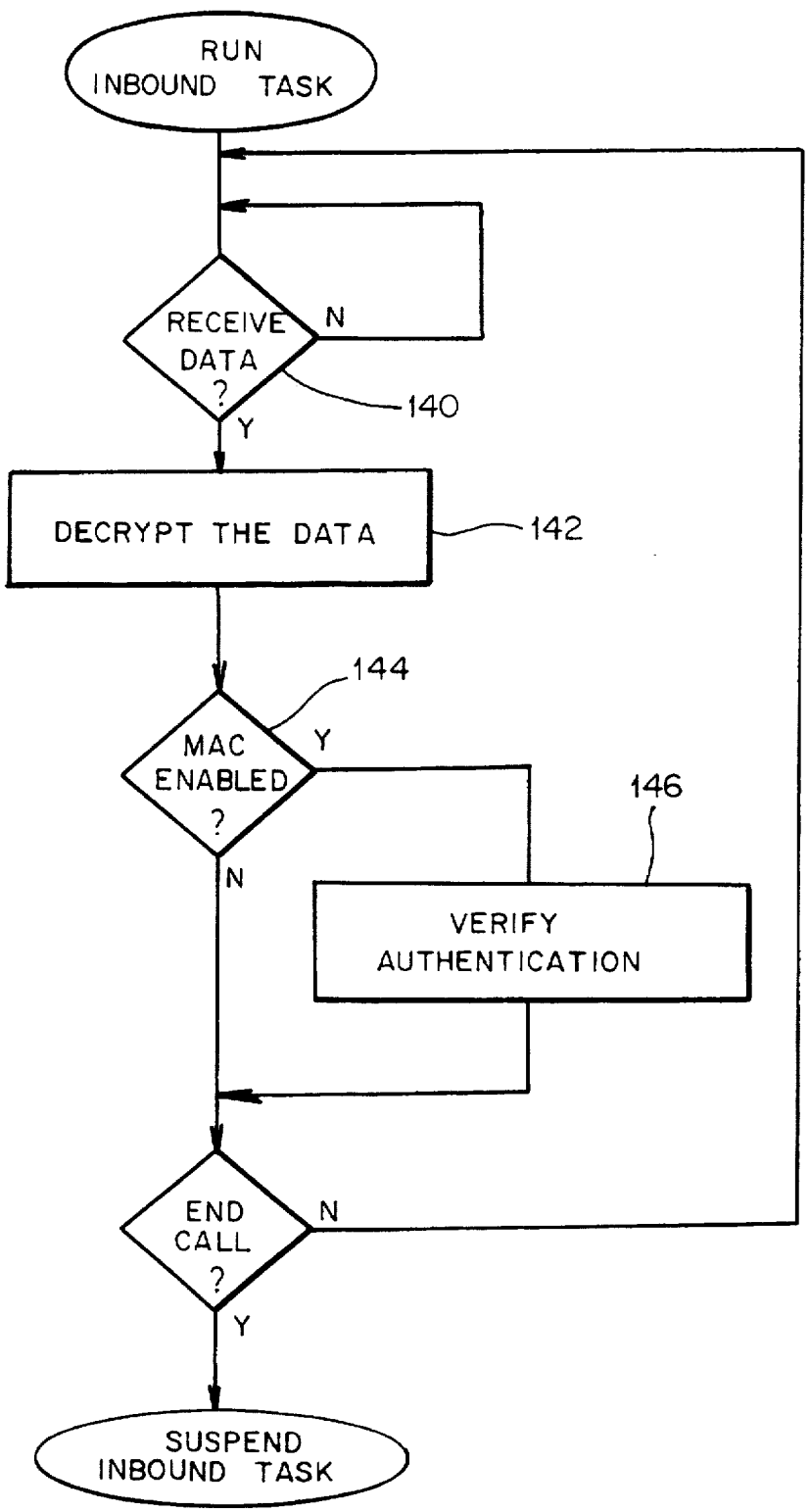
FIG. 9 is a flow diagram which indicates the protocol for processing an inbound task.

After the user has been successfully authenticated as described in the prior paragraph, two concurrent tasks begin to operate, the Inbound Task (see FIG. 9), which processes data from the network, and the outbound task (see FIG. 10), which processes data to the network. Referring to FIG. 9, the Inbound Task simply decrypts (Block 142) data received by the modem and then verifies (Block 146) the data if the message authentication option is enabled. When the call ends and carrier drops, the task is suspended.

Figure 10:
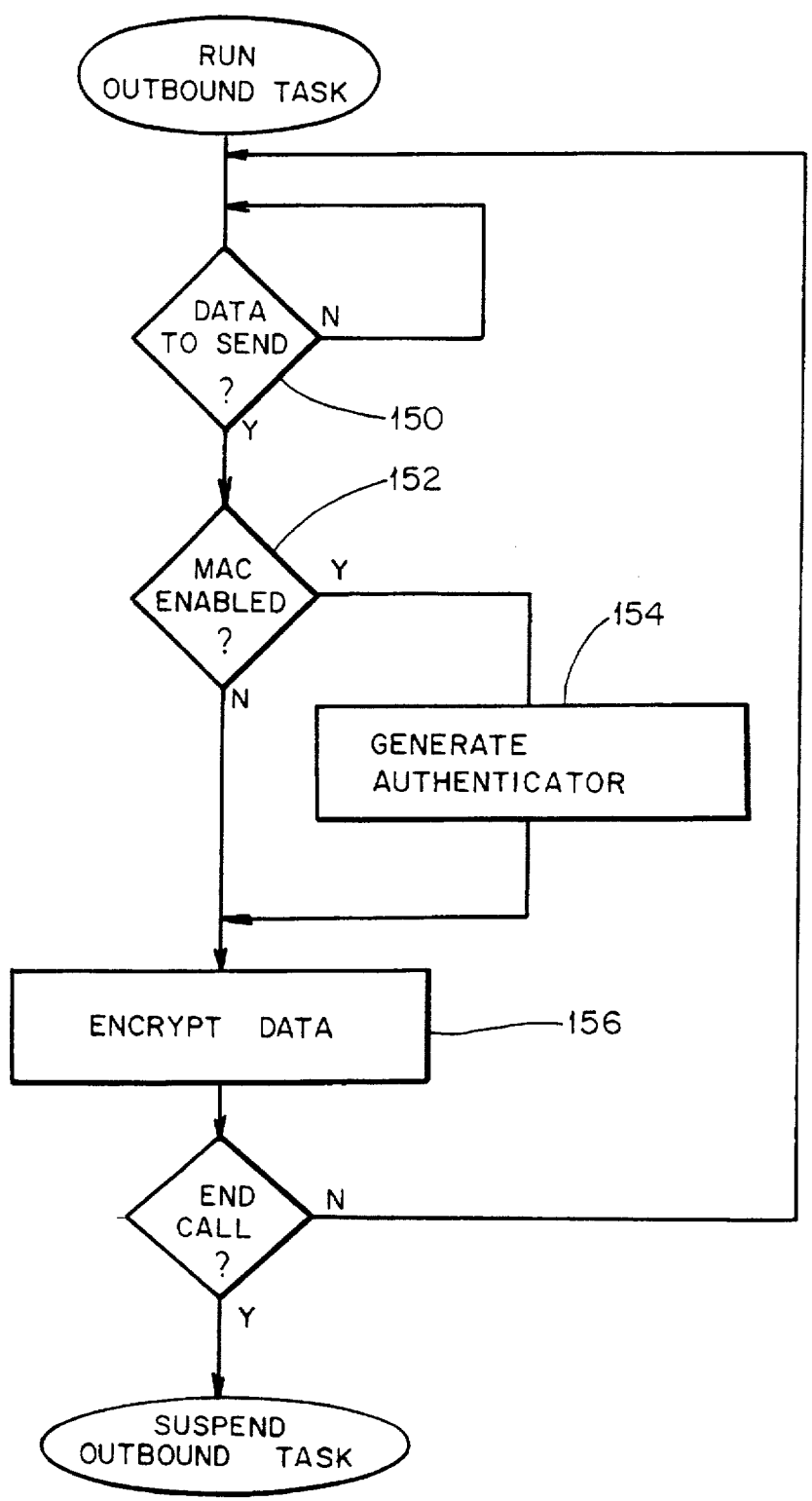
FIG. 10 is a flow diagram depicting the protocol for processing an outbound task.

The Outbound Task simply reverses the order of processing. In FIG. 10, when data is received (Block 150) to be sent to the modem, it is first subjected to message authentication (Block 152) as previously described, if that feature is enabled. It is encrypted (Block 156) in a loop which continues until the end of the call.

Figure 11A:
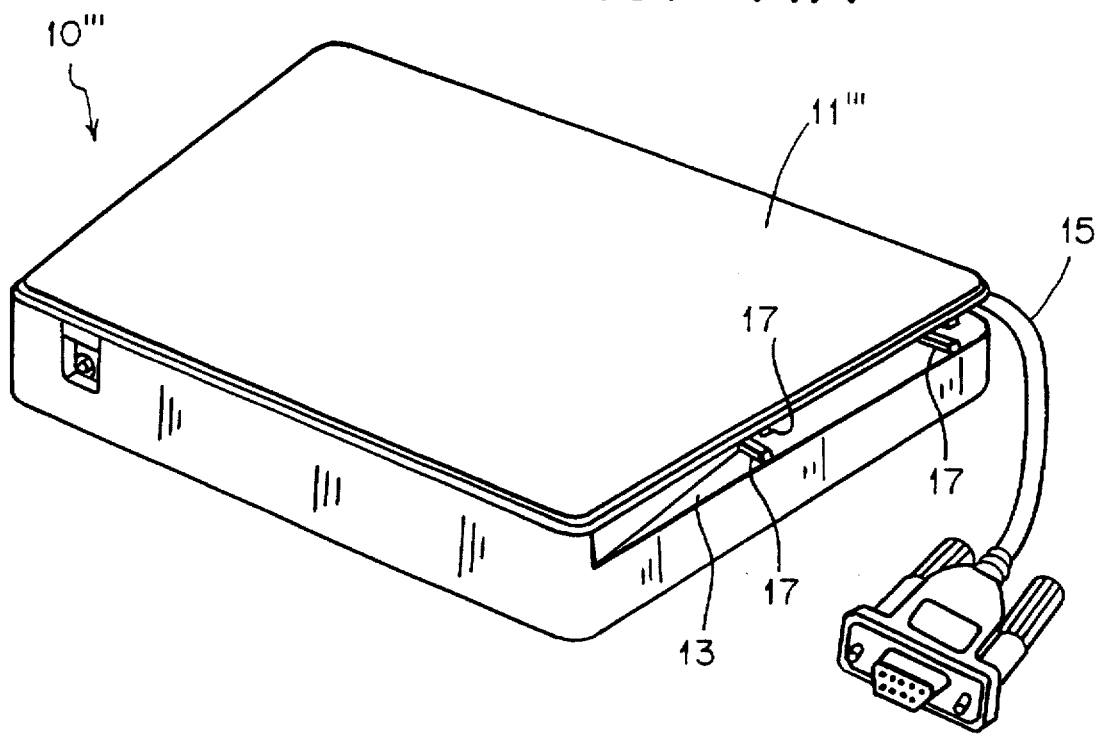
FIGS. 11A and 11b are perspective views which depict yet another feature of the present invention relating to portable characteristics of the housing.
Figure 11B:
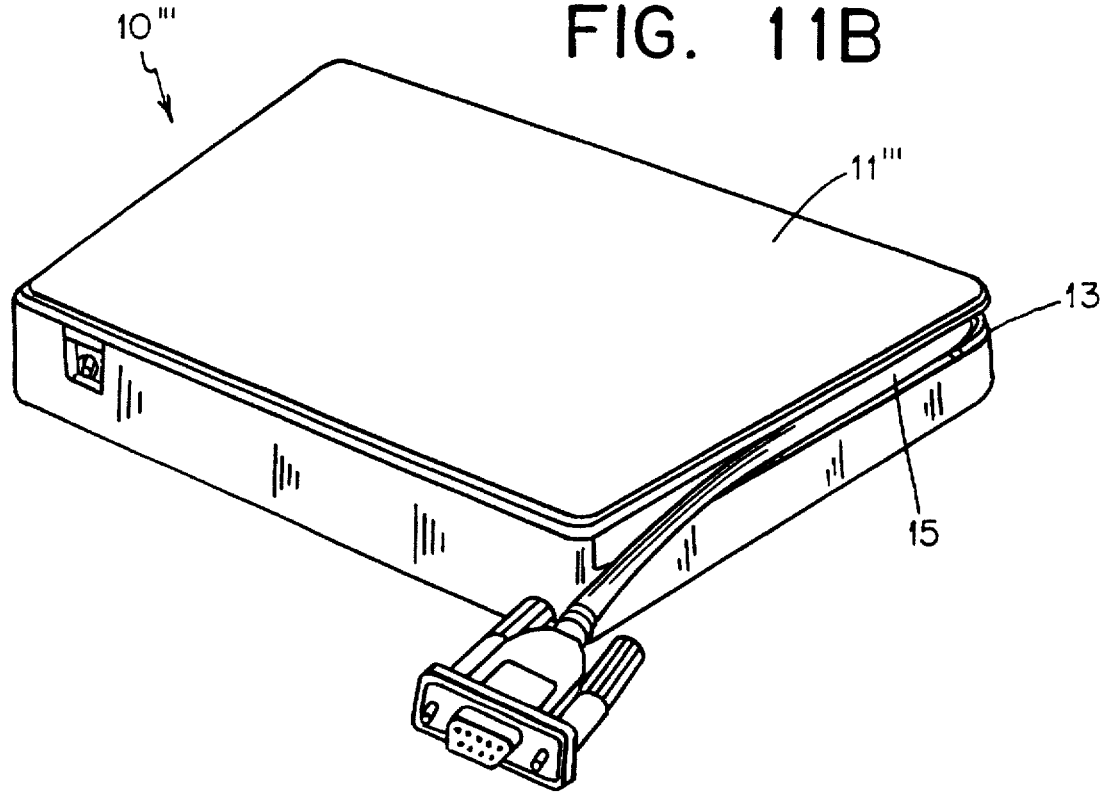

Referring to FIGS. 11A and 11B, yet another feature of the present invention is shown which enhances its portability and compactness. In particular, a encrypting/authenticating device 10''' is shown wherein the housing 11''' includes an elongated slot 13 which is provided to accommodate a cable 15 attached to the device to implement the required connections. The slot preferably includes a plurality of projecting ribs 17, which are sized to releasably engage cable 15 when such cable is pressed therebetween. Moreover, the elongated slot 13 can be provided on one or more sides of the housing 10'''. When it is provided on two sides of the housing, the cable 15 can be fed into the slot 13 and rapped continuously around the housing as depicted in FIG. 11B. Another embodiment includes a deeper slot 13 which would accommodate at least a double fold of cable 15 so that it could be extended and returned on a single side of the housing 10'''. Those skilled in the art will be best equipped to design the slot 13 to accommodate the intended use.

Thus, while there have been described what are currently believed to be the preferred embodiments of the present invention, those skilled in the art will realize that other and further modification and changes may be made thereto without departing from the true spirit of the invention, and it is intended to claim all such changes and modifications as come within the scope as set forth in the appended claims.

What is claimed is:

1. An authenticating and encrypting communications device for establishing a secure communications link between a remote computing site and a computing device of a user over a data transfer path, said communications device comprising:

an encryptor for encrypting transmit data to be transmitted to said remote computing site over said data transfer path, and for decrypting receive data received by said communications device from a source;

an authenticator for authenticating to said remote computing site that said communications device is authorized;

a modem for transmitting the transmit data and for receiving the receive data over said data transfer path; and a compact, pocket-sized housing containing said encryptor, said authenticator and said modem, said encryptor, authenticator and modem being electrically interconnected and being electrically configured for interconnection with said data transfer path and said computing device of said user.

2. A communications device in accordance with claim 1, wherein said authenticator includes means for authenticating the identity of said user to said remote computing site.

3. A communications device in accordance with claim 1, wherein said authenticator includes means for verifying the source and accuracy of said receive data.

* * * * *